D. M. BLISS.
ALTERNATING CURRENT RECTIFIER.
APPLICATION FILED AUG. 21, 1911.
1,064,434.
Patented June 10, 1913.
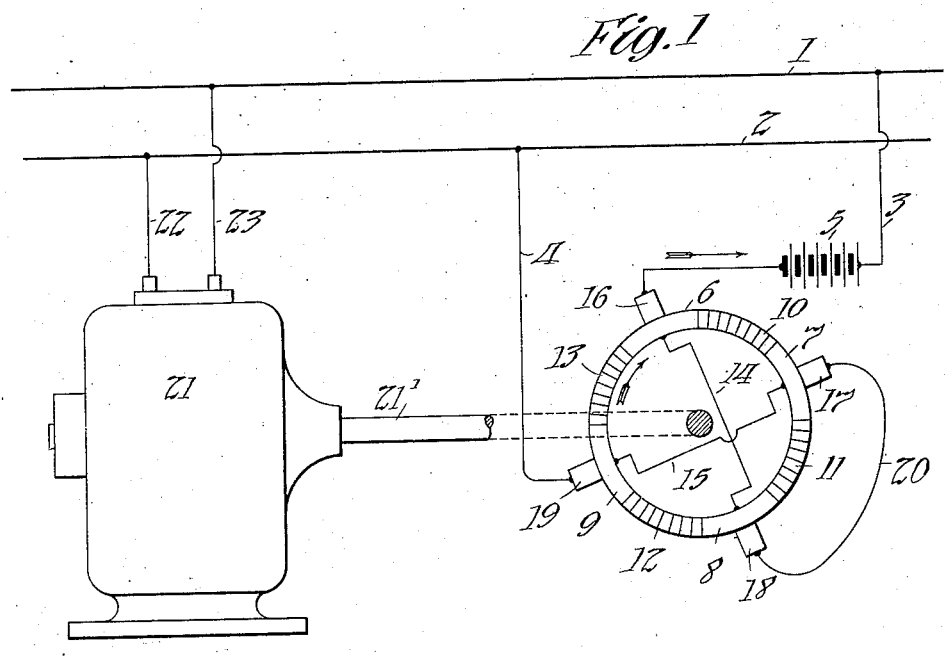
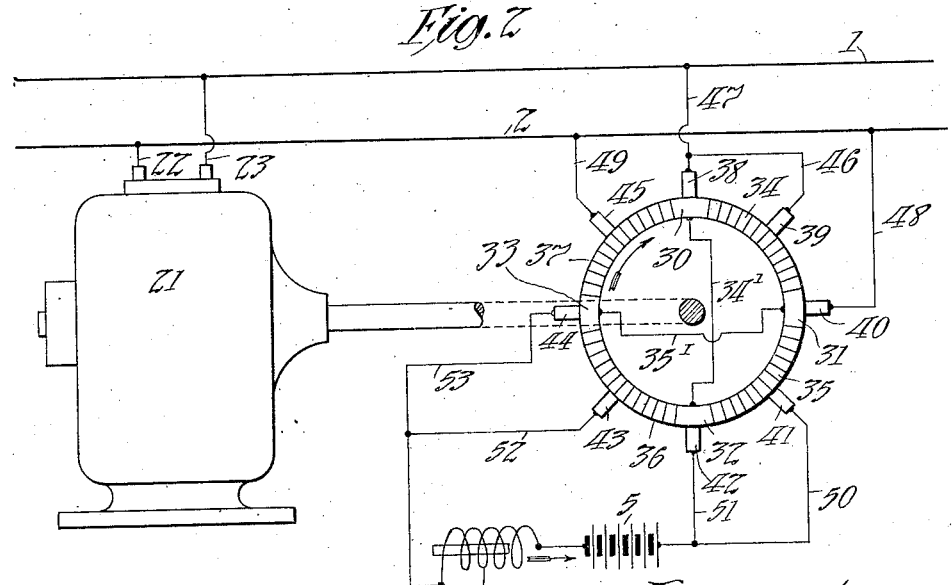
Witnesses:
Inventor:
Donald M. Bliss
by Frank C. ———
his Atty.

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

ALTERNATING-CURRENT RECTIFIER.

1,064,434.   Specification of Letters Patent.   Patented June 10, 1913.

Application filed August 21, 1911. Serial No. 645,163.

*To all whom it may concern:*

Be it known that I, DONALD M. BLISS, a subject of the King of Great Britain, and a resident of West Orange, in the county of Essex and State of New Jersey, have invented certain new and useful Improvements in Alternating-Current Rectifiers, of which the following is a specification.

In my applications Serial No. 584,039, filed September 27, 1910, and Serial No. 645,164, filed on even date herewith, I have described and claimed a rectifying system in which two-part rectifying switches, each provided with its own set of brushes, are arranged in series in such a manner that the connection leading from the alternating current supply circuit to the direct current work circuit is broken simultaneously at a plurality of points, so as to minimize sparking.

My present invention comprises an improvement on the inventions described and claimed broadly in the aforesaid applications, and consists in simple and efficient means for rectifying alternating current for any purpose, as, for example, charging storage batteries, and combines the advantages of a series of breaks or gaps with that of a single rotating commutator or switch, whereby the expense of construction is reduced, and the device is rendered more compact and efficient.

My invention consists also in the combinations and details of construction hereinafter described and claimed.

In the accompanying drawings which form a part of this specification, and in which like reference characters are used to designate like parts throughout the several views—Figure 1 is a diagrammatic view showing an embodiment of my invention adapted to utilize alternate half waves of alternating current; and Fig. 2 is a diagrammatic view of another embodiment of my invention adapted to utilize both half waves of alternating current.

Referring to Fig. 1 of the drawings, alternating current mains are shown at 1 and 2, and are fed from any convenient source with alternating current to be rectified. My improved rectifying device is connected in a circuit 3, 4, across the alternating current mains 1 and 2, and the said circuit 3, 4 contains a direct current translating device, as for example, a battery 5, to which the rectified current is to be supplied. My improved rectifying device comprises active segments 6, 7, 8 and 9 of conducting material, and dead sections 10, 11, 12 and 13. The dead sections serve to insulate the active segments from each other, and may consist of single pieces of insulating material, but are preferably constructed of segments of the same conducting material as the active segments, the said segments being separated from each other by means of insulating material, such as mica. The advantage of this construction is that the commutating device wears down uniformly over all of its surface. Oppositely disposed active segments 6 and 8 are connected by a conductor 14, and oppositely disposed segments 7 and 9 are connected by a conductor 15. Brushes 16, 17, 18 and 19, equal in number to the number of active segments, are provided for the rectifying device, and symmetrically disposed around the same and adapted to contact with the active segments. Brushes 17 and 18 are connected by a conductor 20, and the brushes 16 and 19 are connected in the direct current work circuit 3, 4 in series with the direct current translating device 5, and to the alternating mains 1 and 2. In the embodiment of my invention which I have illustrated, the brushes 16, 17, 18 and 19 are stationary, and means is provided for rotating the commutating device in synchronism with the current to be rectified. A synchronous motor 21, connected across the alternate current mains by the conductors 22 and 23 and connected to the commutating device in any suitable manner, as by a shaft 21', may be employed for this purpose. I have illustrated a commutating device containing four active segments, and the proper speed for such a device corresponds to that of an eight-pole synchronous motor. In general, if the commutating device is operated at the same speed as the motor, the number of active segments and the number of brushes are each equal to half the number of poles of the motor. Obviously, gearing may be interposed between the commutating device and the synchronous motor, and if the speed ratio is changed by such gearing, the relation between the number of active segments and the number of poles of the motor will be altered. The position of the rectifying device and brushes shown in this figure corresponds to the crest of one of the half waves of the alternating current to be rectified, and the path of the current may be traced as follows: from the alternating current main 2, through conductor 4, brush 19, active segment 9, conductor 15, active segment 7, brush 17, conductor 20, brush 18, active segment 8, conductor 14, active segment 6, brush 16, through the battery or direct current translating device 5, and conductor 3, to the alternating current main 1. This circuit is kept closed substantially throughout this half wave. During the next half wave the circuit is broken, and during the succeeding half wave it is reëstablished, and so on indefinitely. In this form of apparatus, only alternate half waves of alternating current are utilized.

In Fig. 2 I have illustrated a modification of the structure shown in Fig. 1, and in which both half waves of the alternating current are utilized. In this figure, as in Fig. 1, the alternating current mains are shown at 1 and 2, the direct current translating device or battery at 5, and the synchronous motor at 21, connected to the alternating current mains 1 and 2 by the conductors 22 and 23. The rectifying or commutating device comprises active segments 30, 31, 32 and 33 of conducting material, and dead sections 34, 35, 36 and 37. The dead sections serve to insulate the active segments from each other and consist preferably of conducting sections of the same material as the active segments, and insulated from each other by any suitable material, such as mica. The oppositely disposed active segments 30 and 32 are connected by conductor 34′ and the oppositely disposed active segments 31 and 33 are connected by the conductor 35′. Brushes 38, 39, 40, 41, 42, 43, 44 and 45 are symmetrically arranged around the commutating or rectifying device and are adapted to contact with the segments thereof. In this modification the number of brushes is twice the number of active segments. The brushes 38 and 39 are connected to one of the alternating current mains 1 in any suitable manner, as by conductors 46 and 47, and the brushes 40 and 45 are connected to the other alternating current main 2 by any suitable means, as by conductors 48 and 49. The brushes 41 and 42 are connected to one terminal of the battery 5, as by conductors 50 and 51, and the brushes 43 and 44 are connected to the other terminal of the battery as by conductors 52 and 53. An adjustable reactance 54 may be inserted in the direct current work circuit for the purpose of smoothing out the rectified current, and also for controlling the phase relation of the current impulses relative to the electro-motive force. In the arrangement of apparatus illustrated in Fig. 2, an eight-pole synchronous motor is employed for driving the rectifying commutator in synchronism with the current to be rectified. The position of the commutating device and brushes shown in Fig. 2 corresponds to the crest of one of the alternating current half waves. The path of the current at this instant may be traced as follows:—from the alternating current main 2, through the conductor 48, brush 40, active segment 31, conductor 35′, active segment 33, brush 44, conductor 53, reactance 54, battery 5, conductor 51, brush 42, conductor 34′, active segment 30, brush 38, conductor 47, to the alternating current main 1. This connection is kept closed substantially throughout one half wave of the alternating current. During the succeeding half wave, the path of the current may be traced as follows:—from the alternating current main 1, through the conductors 47 and 46, brush 39, active segment 30, conductor 34′, active segment 32, brush 43, conductor 52, reactance 54, battery 5, conductor 50, brush 41, active segment 31, conductor 35′, active segment 33, brush 45, conductor 49, to the alternating current main 2. It is apparent that both half waves of the alternating current are utilized in this form of my invention.

In each of the modifications, a number of breaks in series in the circuit occur simultaneously each time a set of brushes passes from a set of active segments. In the specific forms illustrated, there are four such series breaks. Obviously, the number of breaks may be increased by increasing the number of active segments. For example, the number of active segments may be increased to six, eight, twelve, or more.

Having now described my invention, what I claim as new and desire to secure by Letters Patent of the United States is as follows:—

1. In an alternating current rectifying system, a commutator having a plurality of insulated pairs of electrically connected active segments, and a set of brushes common to all of said segments, half of which are arranged to be connected in series during alternate half waves of alternating current, and the other half of which are arranged to be connected in series during the other half waves of alternating current, substantially as described.

2. In an alternating current rectifying system, alternating current mains, a direct current translating device, a plurality of brushes, and a commutator for connecting the direct current translating device to the alternating current mains alternately through each half of the brushes, said commutator having conducting segments, all of which are adapted to coöperate with each of said brushes, substantially as described.

3. In an alternating current rectifying system, alternating current mains, a direct current translating device, a plurality of brushes, and a commutator for connecting the direct current translating device to the alternating current mains alternately through each half of the brushes, the said commutator having active segments adapted to contact with each of said brushes successively, substantially as described.

4. In an alternating current rectifier, a plurality of insulated pairs of oppositely disposed and electrically connected active segments symmetrically disposed and mounted for rotation around an axis, a set of brushes symmetrically disposed around said axis and located to contact with each of said segments during a portion of the rotative movement thereof, and means enabling said brushes to be connected in series through all of said segments while said brushes and segments are in contact, substantially as described.

5. In an alternating current rectifier, a plurality of insulated pairs of oppositely disposed and electrically connected active segments, said segments being symmetrically disposed and mounted for rotation around an axis, and a set of brushes, the number of which divided by the number of active segments is an integer, symmetrically disposed around said axis and located to contact with each of said segments during a portion of the rotative movement thereof, substantially as described.

6. In an alternating current rectifier, a plurality of oppositely disposed and electrically connected pairs of active conducting segments, having contact surfaces lying in a cylindrical surface, and dead sections of the same material as the active segments located between adjacent active segments and insulated therefrom, said dead sections having contact surfaces lying in the same cylindrical surface as the contact surfaces of the active segments, substantially as described.

This specification signed and witnessed this 18th day of August 1911.

DONALD M. BLISS.

Witnesses:
HENRY LANAHAN,
ANNA R. KLEHM.